US006047453A

United States Patent [19]
Matsudome

[11] Patent Number: 6,047,453
[45] Date of Patent: Apr. 11, 2000

[54] AIR-CORE COIL FORMING SYSTEM

[75] Inventor: Takatsugu Matsudome, Kanagawa, Japan

[73] Assignee: Mitsumi Electric Co., Ltd., Tokyo, Japan

[21] Appl. No.: 09/141,418

[22] Filed: Aug. 27, 1998

[30] Foreign Application Priority Data

Dec. 26, 1997 [JP] Japan .................................. 9-368655
Dec. 26, 1997 [JP] Japan .................................. 9-368656

[51] Int. Cl.[7] .......................... B23P 23/04; B21C 47/02
[52] U.S. Cl. ........................ 29/33 M; 29/564.4; 242/443
[58] Field of Search ................................ 29/33 F, 33 L, 29/564.4, 33 M; 242/443, 447.3, 437.1, 448

[56] References Cited

U.S. PATENT DOCUMENTS

| | | | |
|---|---|---|---|
| 2,494,286 | 1/1950 | Collins | 113/1 |
| 2,514,970 | 7/1950 | Prickett | 242/68 |
| 2,558,564 | 6/1951 | Jensen | 242/9 |
| 2,645,959 | 7/1953 | Fuchs et al. | 81/9.51 |
| 2,952,960 | 2/1960 | Clauss | 242/9 |
| 3,024,497 | 3/1962 | Hardesty et al. | 18/19 |
| 3,222,000 | 12/1965 | White | 242/9 |
| 3,535,865 | 10/1970 | Botz | 57/11 |
| 3,558,068 | 1/1971 | Albrecht | 242/7.07 |
| 3,643,326 | 2/1972 | Boke et al. | 29/605 |
| 3,656,218 | 4/1972 | Staiger et al. | 29/33 F |
| 3,911,541 | 10/1975 | Ziemek et al. | 29/33 F |
| 3,951,016 | 4/1976 | Gudmestad et al. | 81/9.51 |
| 4,008,594 | 2/1977 | Noyce | 72/142 |
| 4,061,289 | 12/1977 | Miura et al. | 242/7.13 |
| 4,091,695 | 5/1978 | Funcik et al. | 81/9.51 |
| 4,345,362 | 8/1982 | De Givry | 29/426.5 |
| 4,380,111 | 4/1983 | Galloup et al. | 29/564.4 |
| 4,436,001 | 3/1984 | Ergler et al. | 81/9.51 |
| 4,523,447 | 6/1985 | Sticht et al. | 72/144 |
| 4,663,822 | 5/1987 | Blaha et al. | 29/564.4 |
| 4,738,019 | 4/1988 | Kawaguchi | 29/564.4 |
| 4,833,778 | 5/1989 | Loustau | 29/857 |
| 4,993,287 | 2/1991 | Carpenter et al. | 81/9.51 |
| 5,178,194 | 1/1993 | Uchino et al. | 140/92.1 |
| 5,328,109 | 7/1994 | Takahashi | 242/7.08 |
| 5,347,332 | 9/1994 | Wakabayashi | 354/173.1 |
| 5,689,874 | 11/1997 | College | 29/564.4 |
| 5,758,402 | 6/1998 | Asano et al. | 29/564.4 |
| 5,781,984 | 7/1998 | Koch et al. | 29/564.4 |
| 5,784,770 | 7/1998 | Long, Jr. et al. | 29/564.4 |
| 5,797,299 | 8/1998 | Long, Jr. | 81/9.51 |
| 5,864,940 | 2/1999 | Takahata et al. | 29/596 |
| 5,904,610 | 5/1999 | Cinoglio et al. | 451/38 |

*Primary Examiner*—David P. Bryant
*Assistant Examiner*—Essama Omgba
*Attorney, Agent, or Firm*—Whitham, Curtis & Whitham

[57] ABSTRACT

A air-core coil forming system which comprises a sheath peeling section and a coil forming section. The sheath peeling section includes a rotatable cylindrical cutting head having a through hole provided at radial center portion thereof into which the sheathed wire is inserted, a blade portion for peeling the sheath of the sheathed wire, and a blade support member for supporting in a manner that the blade is brought into contact with the sheath by means of a centrifugal force produced when the cutting head is rotated, a motor directly connected with the cutting head for rotating the same, and a rotary shaft provided in the motor such that a central axis thereof coincides with the through hole of the cutting head and having hollowed structure into which the sheathed wire is inserted. The coil forming section includes a shaft, a base member capable of revolving around the shaft and shifting in a radial direction of the shaft, a fixation member integrally provided on the base member and capable of clipping a peeled wire supplied from the sheath peeling section together with the shaft therebetween, a first urging member for urging the base member in a direction that the fixation member closes to the shaft, a second urging member for urging the base member opposite to the urging direction of the first urging member, and a rotation mechanism for rotating the shaft to wind the peeled wire therearound.

17 Claims, 8 Drawing Sheets

AIR-CORE COIL FORMING SYSTEM

BACKGROUND OF THE INVENTION

1. Technical Field of the Invention

The present invention relates to an air-core coil forming system in which a sheath of a sheathed wire is peeled by a rotating cutting head and the peeled wire is wound in a spiral manner to thereby form an air-core coil.

2. Description of the Related Art

FIG. 11 shows a whole side view of a conventional air-core coil winding system which forms automatically a large number of air-core coils out of a single continuous insulating sheathed wire. In FIG. 11, reference numeral 1 denotes a continuous sheathed wire serving as a wire material, 2 a sheath peeling section for peeling the sheath (for example, polyurethane) of the sheathed wire 1 in part, 3 a lead feeding section for feeding the sheathed wire 1 by a required length, 4 a coil forming section for winding the sheathed wire 1 to thereby form air-core coils, and 5 a lead cutting section for cutting the sheathed wire 1 into a length required for formation of an air-core coil.

The sheath peeling section 2 includes a cutting head for peeling the insulating sheath of the sheathed wire 1. The cutting head includes a blade for cutting the sheath due to a centrifugal force produced when it is driven and rotated, and a support mechanism for supporting the same. A motor is utilized as a rotation drive source of the cutting head.

In a conventional sheath peeling section, the rotational force of a driving motor is transmitted to a cutting head through a transmission mechanism which is composed of a combination of a belt and a gear. However, use of such transmission mechanism not only increases the size of the sheath peeling section but also increases the number of parts used to thereby increase the cost of the sheath peeling section.

FIG. 12(A) shows a state that a sheath 11 placed in the leading end portion of the sheathed wire 1 is peeled by the sheath peeling section 2 and then a core wire 12A is exposed. A core wire 12B located in the rear portion of the sheathed wire 1 is a portion which is exposed when the sheath 11 of the sheathed wire 1 is peeled by the sheath peeling section 2 after the entire sheathed wire 1 is fed by a required length. The cutting of the core wires 12A and 12B is carried out by the lead cutting section 5. Also, FIG. 12(B) shows an air-core coil 6 which is completed after it is wound by the coil forming section 4.

The above-mentioned air-core coil 6 that is wound by the coil forming section 4 includes two kinds of air-core coils, that is, a left hand air-core coil and a right hand air-core coil. To manufacture the two kinds of air-core coils, that is, the left and right hand air-core coils by a single coil forming section 4, normally, parts provided within the coil forming section 4 must be replaced or adjusted; but, such replacing or adjusting operation is complicated.

SUMMARY OF THE INVENTION

Accordingly, it is a first object of the present invention to provide an air-core coil forming system including a sheath peeling section for peeling the sheath of a sheathed wire, which employs a structure that a cutting head can be driven directly by a driving motor to thereby be able not only to reduce the number of parts used and the cost but also to save the space of the sheath peeling section.

Also, it is a second object of the present invention to provide an air-core coil forming system including a sheath peeling section for peeling the sheath of a sheathed wire, which can prevent sheath dust peeled from the sheathed wire from scattering to the periphery of the sheath peeling section.

Further, it is a third object of the present invention to provide an air-core coil forming system which can manufacture left and right hand air-core coils simply by rotating a chuck unit for holding the leading end portion of a wire by 180 degrees while eliminating the need for execution of the complicated operation to replace or adjust the parts.

In order to achieve the objects, there is provided a air-core coil forming system comprising a sheath peeling section and a coil forming section.

The sheath peeling section in the system includes: a rotatable cylindrical cutting head having a through hole provided at radial center portion thereof into which the sheathed wire is inserted, a blade portion for peeling the sheath of the sheathed wire, and a blade support member for supporting in a manner that the blade is brought into contact with the sheath by means of a centrifugal force produced when the cutting head is rotated; a motor directly connected with the cutting head for rotating the same; and a rotary shaft provided in the motor such that a central axis thereof coincides with the through hole of the cutting head and having hollowed structure into which the sheathed wire is inserted.

In addition, the sheath peeling section further includes an urging member for urging the cutting head and the motor in the axial direction thereof to shift the same in a length of the peeled sheath at the time of peeling operation.

The direct connection of the motor to the cutting head eliminates the need for provision of a power transmission mechanism such as a belt, a gear and the like, which reduces the number of parts accordingly, thereby being able to reduce the cost of the sheath peeling section. Also, the space necessary for installation of the sheath peeling section can be saved. When the motor and cutting head are connected directly to each other, there arises a problem, that is, how to supply a continuous sheath wire to the cutting head continuously. According to the present invention, this problem is solved in such a manner that the rotary shaft of the motor is made hollow and the hollow rotary shaft is used as the supply passage of the sheathed wire.

Furthermore, the sheath peeling section may include a cover member for covering the cutting head, an air introduction member for introducing pressurized air to inside of the cover member to blow off sheath dusts produced by the peeling operation from the cutting head, and a dust receiving member provided on the cover member detachably for receiving the sheath dusts blown off by the pressurized air.

According to the present invention, the sheath dust peeled from the sheathed wire by the cutting head is prevented from scattering outwardly from the cover member. Also, since the pressurized air is introduced into the cover member and the sheath dust is collected into the dust receiving member by means of the pressurized air, the sheath dust can be removed together with the dust receiving member. This eliminates the possibility that the periphery of the sheath peeling section can be contaminated with the sheath dust.

A coil forming section in the system includes: a shaft; a base member capable of revolving around the shaft and shifting in a radial direction of the shaft; a fixation member integrally provided on the base member and capable of clipping a peeled wire supplied from the sheath peeling section together with the shaft therebetween; a first urging member for urging the base member in a direction that the fixation member closes to the shaft; a second urging member for urging the base member opposite to the urging direction of the first urging member; and a rotation mechanism for rotating the shaft to wind the peeled wire therearound.

The shaft having a small diameter portion in which the peeled wire is wound therearound and a large diameter portion, and a gap between the fixation member and the large diameter portion produced by shifting of the base portion due to the urging by the second urging member is smaller than the diameter of the peeled wire.

According to the present invention, there can be realized a coil forming section which, by rotating the position of the fixation member with the base member with respect to the shaft by 180 degrees, the left and right hand air-core coils can be formed respectively.

In order to ease the switching, the second urging member may include a pair of urging members which are disposed so as to be symmetric with respect to the shaft.

In order to automate the system, one end portion of the shaft in which the small diameter portion is provided may be angled downward. Thus if the fixation member is moved apart from the shaft by the second urging member, the air-core coils are allowed to drop down due to their own weights.

DETAILED DESCRIPTION OF THE PREFERRED EMBODIMENTS

Description of the preferred embodiments will be given below in detail with reference to the accompanying drawings.

Figure 1:
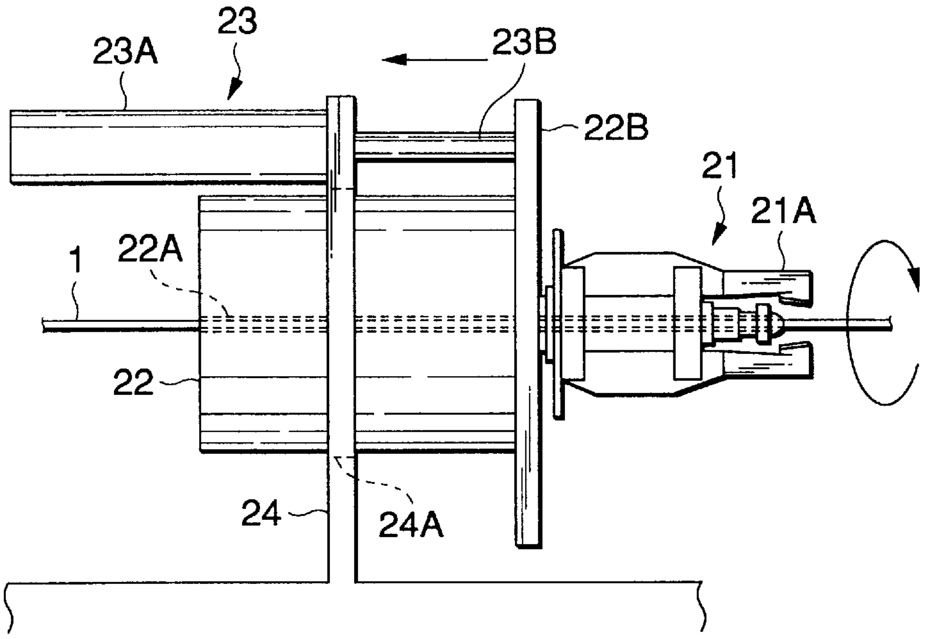
FIG. 1 is a side view of one embodiment of a sheath peeling section according to the present invention.
Figure 2:
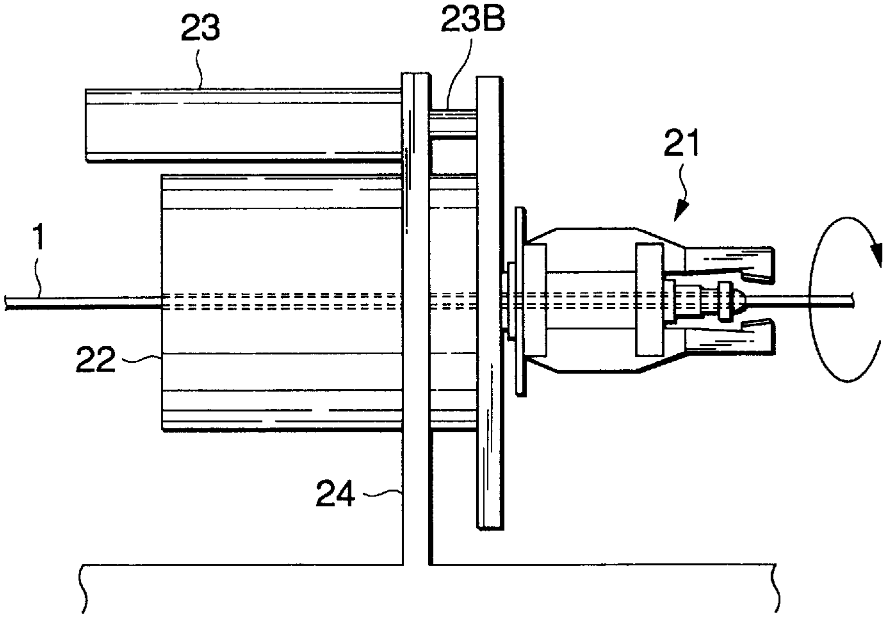
FIG. 2 is a side view of the sheath peeling section shown in FIG. 1, showing the different operation state thereof.

FIGS. 1 and 2 are respectively side views of a sheath peeling section 2 which is one embodiment of the present invention, respectively showing the different operation states thereof. In these figures, reference numeral 21 denotes a cutting head including a cutting blade 21A which is used to peel the sheath of a sheathed wire 1 passing through the center portion thereof by means of a centrifugal force produced by rotating the cutting head 21. A motor 22 rotates the head 21 to thereby produce the centrifugal force. According to the present invention, the rotary shaft 22A of the motor 22 is connected directly to the cutting head 21. In view of this connection of the motor 22 to the cutting head 21, the rotary shaft 22A is formed in a hollow cylindrical shape so that the sheathed wire 1 can be supplied to the cutting head 21 through the hollow portion of the rotary shaft 22A.

A cylinder 23 denotes a cylinder which moves the motor 22 and cutting head 21 integrally in the axial direction thereof to thereby feed the sheathed wire 1 by a length required for peeling of the sheath of the sheathed wire 1. The cylinder 23 is structured such that a main body 23A thereof is fixed to a fixing plate 24, while the leading end of a shaft 23B thereof slidable in the axial direction thereof within the main body 23A is connected to a flange 22B included in the motor 22. In the fixing plate 24, there is formed a through hole 24A which allows the motor 22 to move in the axial direction thereof.

Figure 3A:
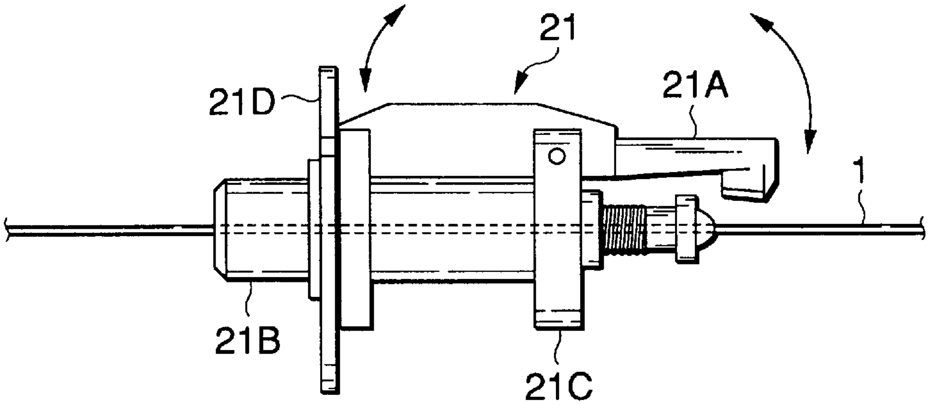
FIG. 3(A) is a side view of a cutting head employed in the above embodiment.
Figure 3B:
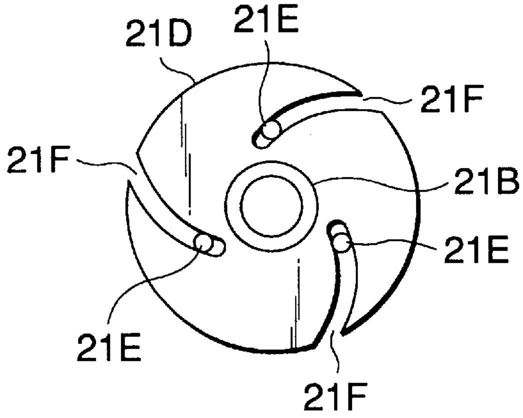
FIG. 3(B) is a rear view of the cutting head employed in the above embodiment.
Figure 3C:
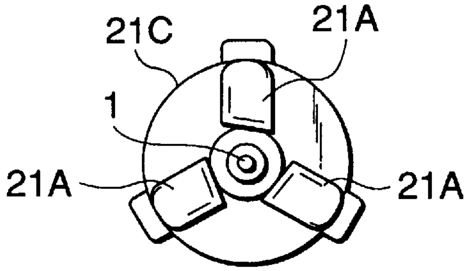
FIG. 3(C) is a front view of the cutting head employed in the above embodiment.

The cutting head 21, as shown in FIG. 3(A) and which is a side view thereof, includes a hollow shaft body 21B in the central portion thereof, an annular portion 21C for supporting the middle portion of the blade 21A thereon, and another annular portion 21D for moving up and down the rear end portion of the blade 21A, while the two annular portions 21C and 21D are respectively fixed to the barrel portion of the cutting head 21 and are spaced in the axial direction thereof from each other. As the blade 21A for peeling the sheath of the sheathed wire 1, according to the present embodiment and as shown in FIG. 3(C) which is a rear view of the cutting head 21, there are disposed three blades 21A which are spaced in the rotation direction of the cutting head 21 by 120 degrees from one another. In the annular portion 21D, as shown in FIG. 3(B) which is a front view of the cutting head 21, there are formed three arc-shaped grooves 21F which are respectively used to guide the rear end projections 21E of the three blades 21A.

With use of the cutting head 21 structured in the above-mentioned manner, when the annular portions 21D are rotated, then there are produced centrifugal forces, so that the projections 21E are respectively guided by their associated grooves 21F due to the thus produced centrifugal forces to move outwardly in the radial direction of the annular portions 21D. As a result of this, the respective leading ends of the three blades 21A approach the sheathed wire 1 and peel the sheath of the sheathed wire 1.

The rotary shaft 22A of the motor 22 is fixed to the shaft body 21B of the cutting head 21 by a screw or the like, so that the motor 22 and cutting head 21 are connected directly to each other. Therefore, if the motor 22 is rotated, then the whole of the cutting head 21 is rotated to thereby produce a centrifugal force, so that the blades 21A are allowed to peel the sheath of the sheathed wire 1 due to the thus produced centrifugal force.

Figure 11:
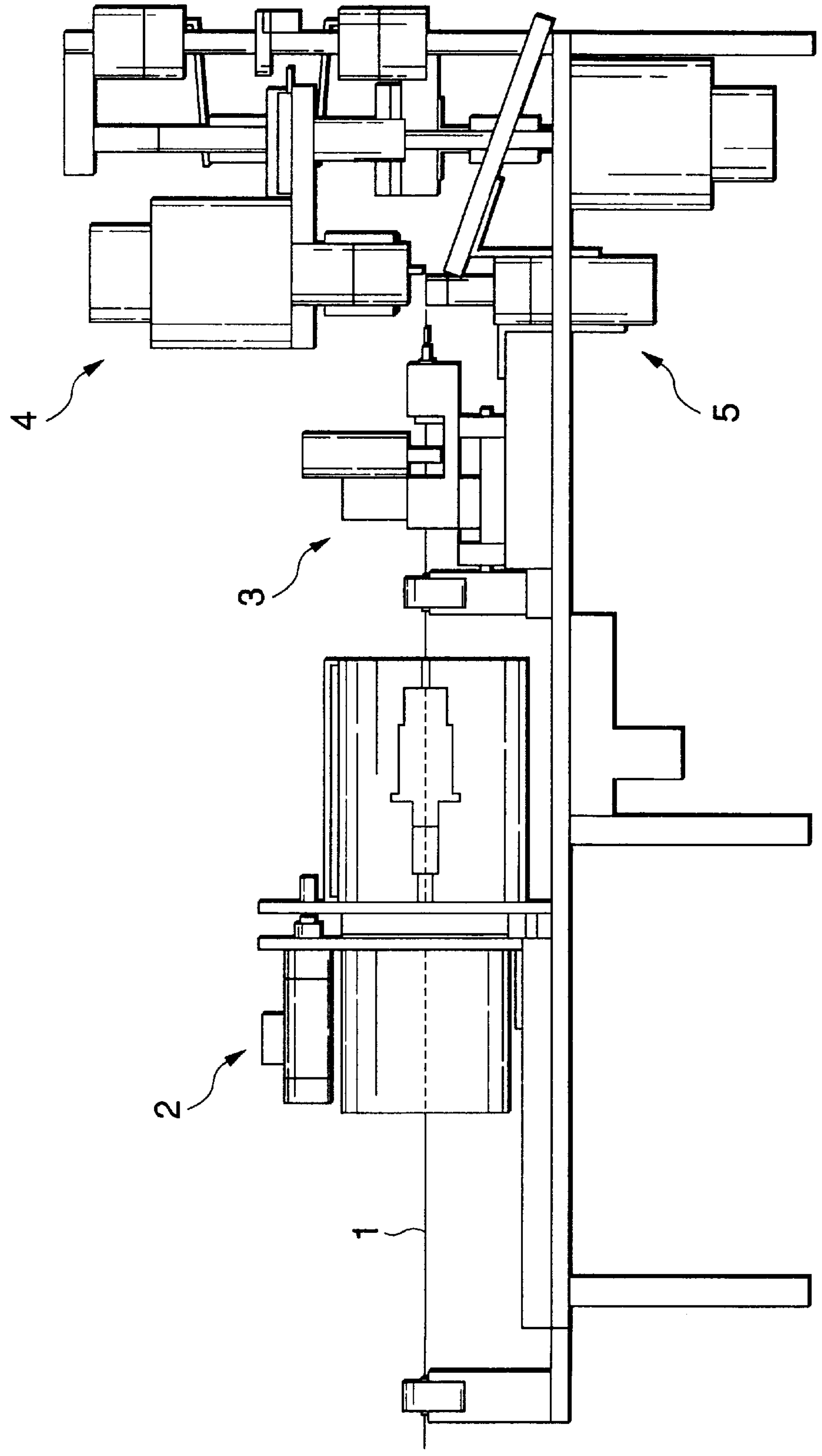
FIG. 11 is a whole side view of a conventional air-core coil winding system.
Figure 12A:
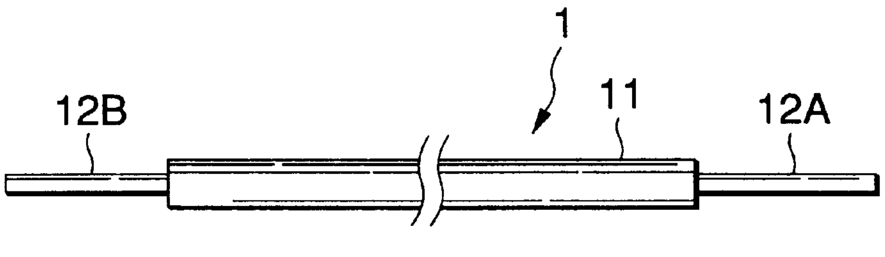
FIG. 12(A) is a schematic illustration showing the sheathed wire after the peeling operation is applied.
Figure 12B:
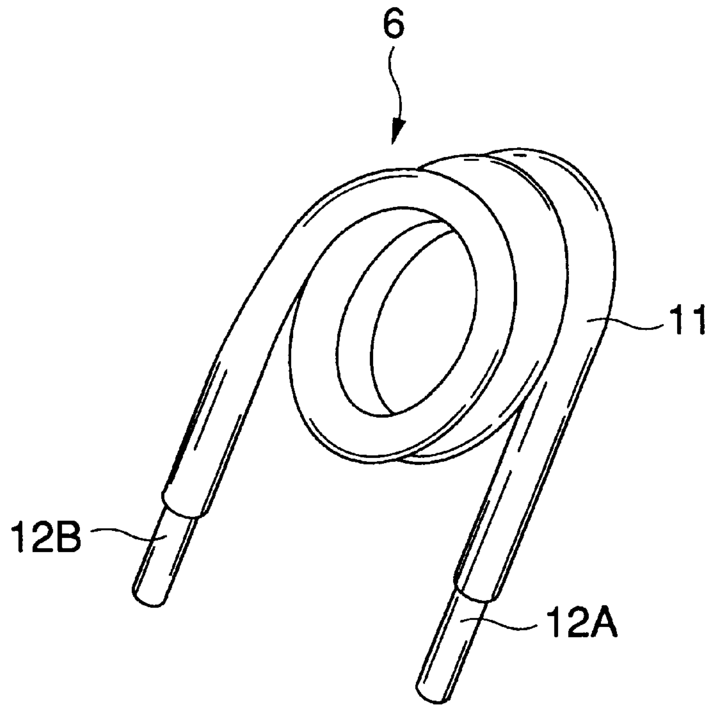
FIG. 12(B) is a perspective view of the air-core coil formed by the coil forming section.

According to the present invention, although the motor 22 and cutting head 21 are connected directly to each other, there is found no obstacle to the supply of the continuous sheathed wire 1. The reason for this is that the rotary shaft 22A of the motor 22 is a hollow structure and the sheathed wire 1 is supplied to the cutting head 21 through the hollow portion of the rotary shaft 22A. The feeding of the sheathed wire 1 is controlled by the lead feeding section 3 shown in FIG. 11.

The cylinder 23 shown in FIG. 1 determines the peeled length of the sheath of the sheathed wire 1 in accordance with the stroke of a shaft 23B thereof. In FIG. 1, the cutting head 21 is held at forwarding position thereof together with the motor 22 because the shaft 23B of the cylinder 23 is projected. On the other hand, in FIG. 2, the cutting head 1 is held at backwarding position thereof together with the motor 22 because the shaft 23B of the cylinder 23 is retreated. During this, the motor 22 continues to rotate and thus the sheath of the sheathed wire 1 is peeled by the blades 21A by a length corresponding to the stroke of the cylinder 23.

Figure 4:
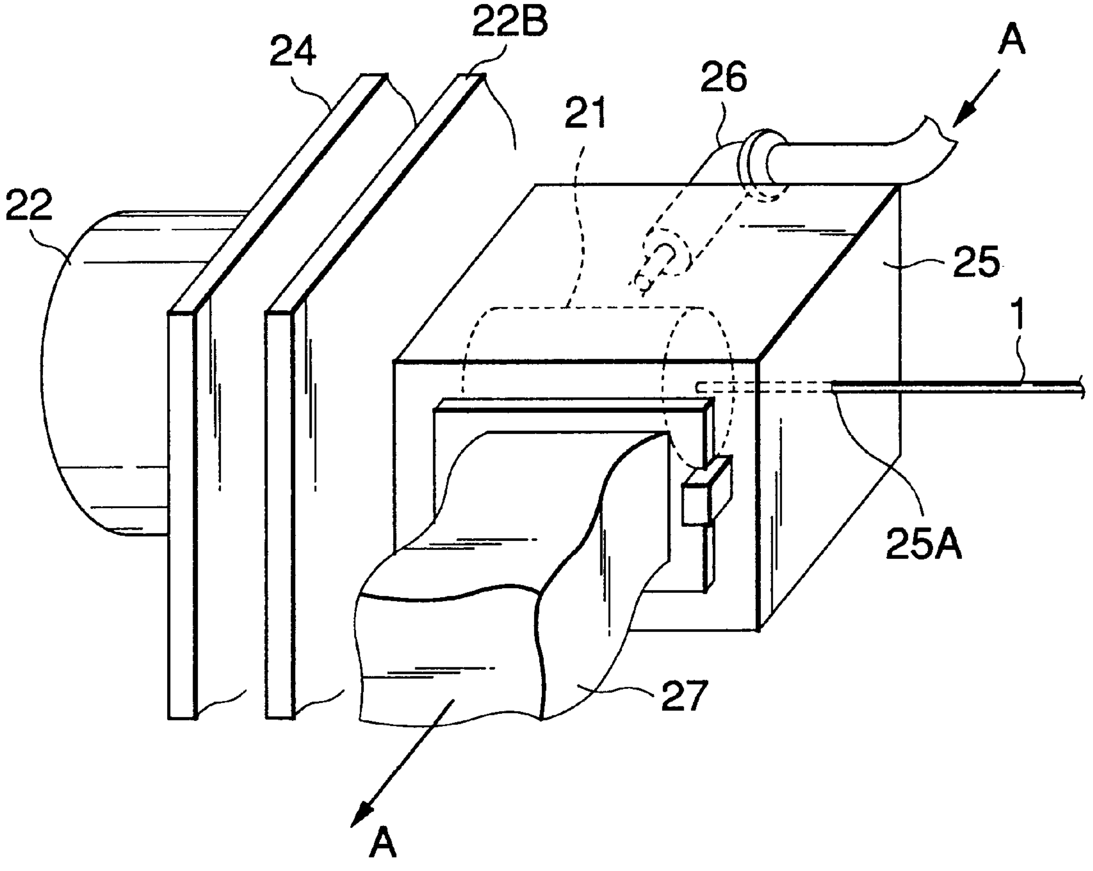
FIG. 4 is a perspective view of another embodiment of a sheath peeling section according to the present invention.

FIG. 4 is a perspective view of another embodiment of a sheath peeling section according to the present invention. The sheath peeling section according to the present embodiment comprises not only the components respectively shown in FIGS. 1 to 3, but also a box 25 for enclosing the periphery of the cutting head 21, a wire guidance hole 25A for guiding out the sheathed wire 1 having passed through the cutting head 21 from the box 25, an air introduction member 26 for introducing a pressurized air A into the box 25, and a collection pack 27 for collecting sheath dust within the box 25 by means of the pressurized air A. The collection pack 27 can be removably mounted onto the box 25.

According to the structure shown in FIG. 4, the sheath dust, which is peeled from the sheathed wire 1 by the cutting head 21, is prevented from scattering externally from the closed box 25. Also, since the pressurized air A is introduced into the box 25 to thereby collect the sheath dust into the collection pack 27, if the collection pack 27 together with the sheath dust is replaced, then the sheath dust can be removed easily. This makes it possible to prevent the periphery of the sheath peeling section 2 from being contaminated with the sheath dust.

Figure 5:
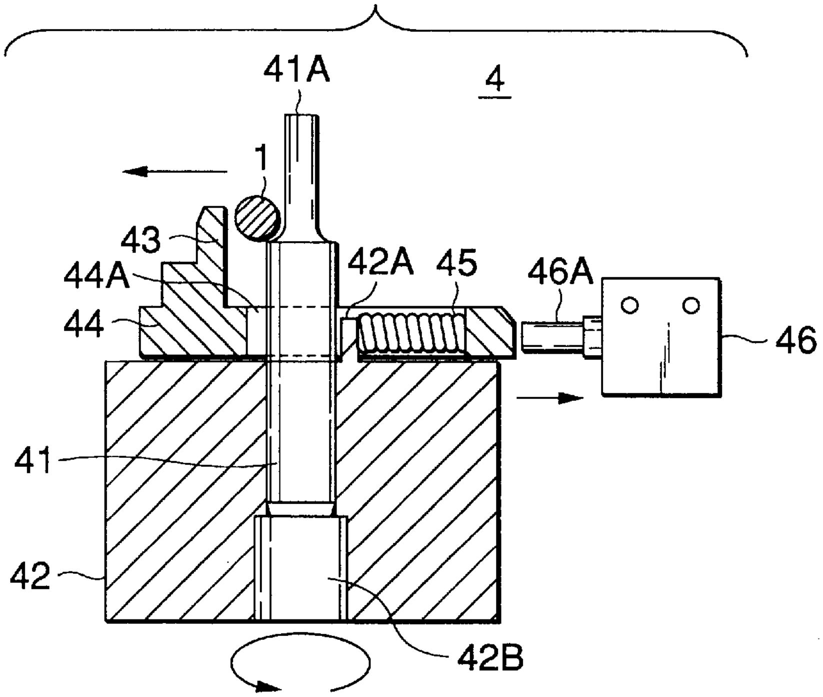
FIG. 5 is a section view of one embodiment of an air-core coil forming section, showing a state thereof in which a chuck is opened in a left hand winding mode.
Figure 6:
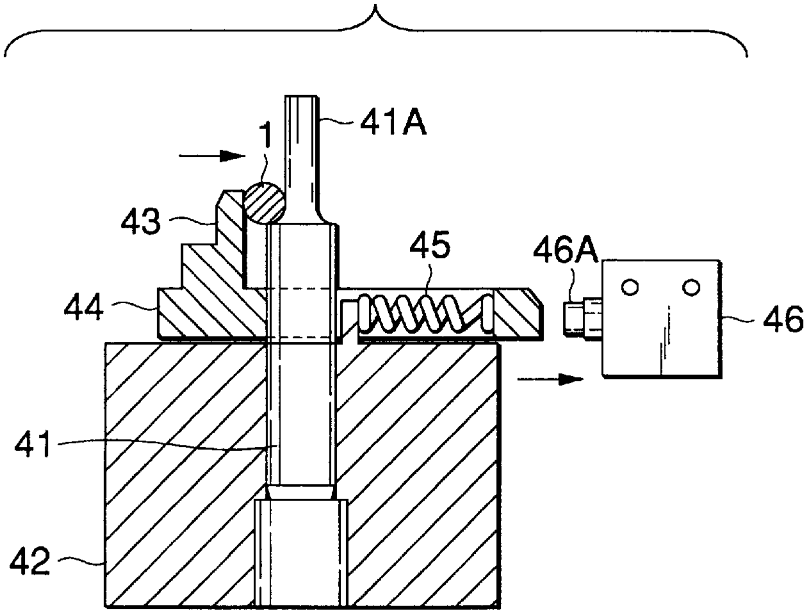
FIG. 6 is a section view of the air-core coil forming section shown in FIG. 5, showing a state thereof when the left hand winding operation is started.
Figure 7:
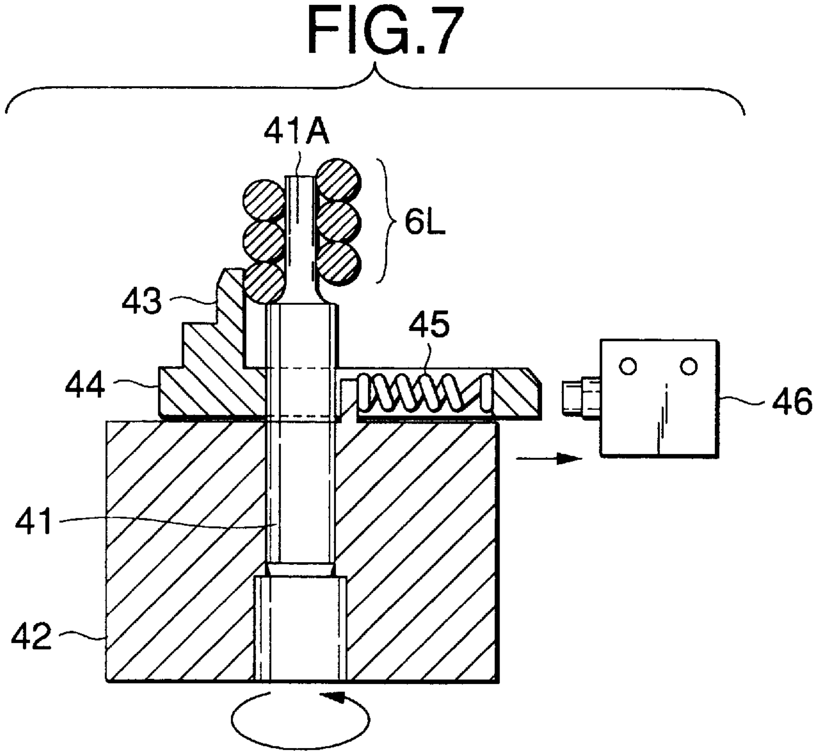
FIG. 7 is a section view of the air-core coil forming section shown in FIG. 5, showing a state thereof when the left hand winding operation is terminated.

FIGS. 5 to 7 are respectively section views of the different operation states of an air-core coil forming section 4 employed in one preferred embodiment of the present invention. In these figures, reference numeral 41 denotes a shaft structured such that it includes in the leading end portion thereof a stepped portion 41A around which a wire 1 can be wound, 42 a shaft holder for supporting the rear end portion of the shaft 41 on the rotation center thereof, 43 a coil stopper for pressing the leading end of the wire 1 against the stepped portion 41A of the shaft 41, and 44 a stopper holder which supports the coil stopper 43 and can be moved in the radial direction of the shaft 41, respectively.

Reference numeral 45 denotes a coiled compression spring for applying an elastic force to the coil stopper 43 through the stopper holder 44, while the elastic force is a force which urges the coil stopper 43 to move toward the shaft 41; and, 46 denotes a cylinder for applying a force to the coil stopper 43 through the stopper holder 44, while the force is a force which urges the coil stopper 43 to move apart from the shaft 41 against the elastic force of the coiled compression spring 45.

In the stopper holder 44, there is formed an elongated hole 44A which can facilitate the movement of the stopper holder 44 in the radial direction of the shaft 41. The coiled compression spring 45 is stored within the elongated hole 44A and is interposed between the wall surface of the elongated hole 44A and a projecting portion 42A which is provided on and projected from the shaft holder 42. In the central portion of the bottom surface of the shaft holder 42, there is formed a circular hole 42B into which the rotary shaft of a motor (not shown) can be mounted.

In FIGS. 5 to 7, there are shown the respective operation states of the air-core coil forming section 4 when the air-core coil forming section 4 forms a left hand air-core coil 6L. In more particularity, FIG. 5 shows a work input/chuck open state in which the cylinder 46 is switched on to thereby project the shaft 46A thereof and the stopper holder 44 is moved to the left in FIG. 5 against the elastic force of the coiled compression spring 45. If the stopper holder 44 is slid to the left, then the coil stopper 43 is moved apart from the shaft 41, so that, between the small-diameter stepped portion 41A of the shaft 41 and the coil stopper 43, there is produced a gap into which the end portion of the wire 1 can be mounted easily. However, between the coil stopper 43 and the large-diameter main body of the shaft 41, a larger gap than the diameter of the wire 1 cannot be produced and therefore the end portion of the wire 1 can be held positively in the stepped portion, thereby eliminating the possibility that the wire 1 end portion can be shifted in the axial direction (in the vertical direction in FIG. 5) of the shaft 41.

FIG. 6 shows a work fixed/chuck closed state in which, in the state of FIG. 5, the cylinder 46 is switched off to thereby retreat the shaft 46A thereof. In this state, the stopper holder 44 is slid to the right in FIG. 6 due to the elastic force of the coiled compression spring 45. According to this, the coil stopper 43 is allowed to approach the stepped portion 41A of the shaft 41 so that it presses against the end portion of the wire 1 to hold the same between the stepped portion 41A and the coil stopper 43.

FIG. 7 shows another state of the air-core coil forming section 4 in which, in the state of FIG. 6, the shaft holder 42 is rotated counterclockwise and a left hand air-core coil 6L is formed in a manner that the sheathed wire 1 is wound around the shaft 41A spirally by a required number of times. The air-core coil 6L is structured such that, if the cylinder 46 is switched on again to thereby move back the coil stopper 43 (that is, open the chuck), then the air-core coil 6L can be removed from the stepped portion 41A of the shaft 41. In the system shown in FIG. 11, because the stepped portion 41A of the shaft 41 is so set as to face downward, if the chuck is opened, then the air-core coil 6L is allowed to drop down due to its own weight.

Figure 8:
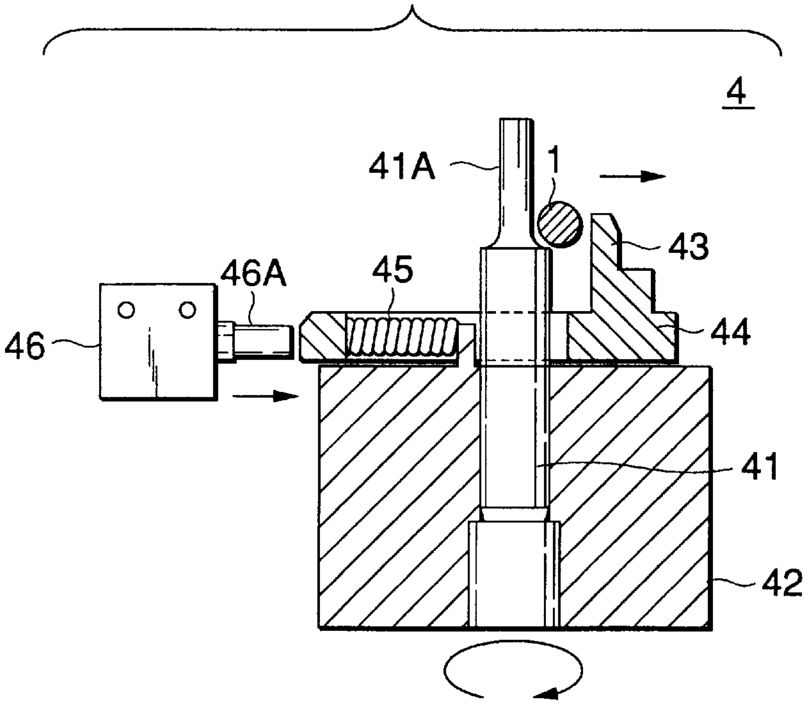
FIG. 8 is a section view of the air-core coil forming section shown in FIG. 5, showing a state thereof in which a chuck is opened in a right hand winding mode.
Figure 9:
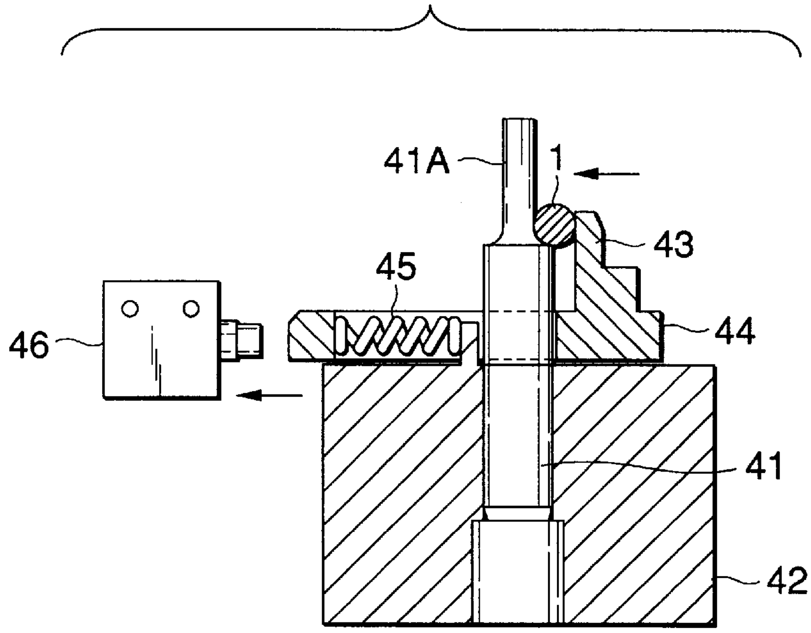
FIG. 9 is a section view of the air-core coil forming section shown in FIG. 8, showing a state thereof when the right hand winding operation is started.
Figure 10:
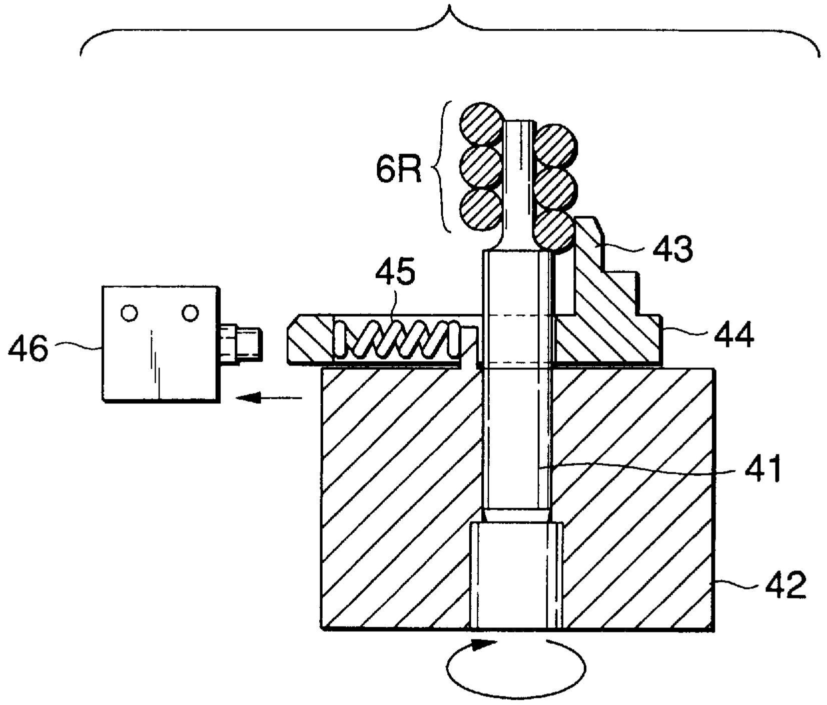
FIG. 10 is a section view of the air-core coil forming section shown in FIG. 8, showing a state thereof when the right hand winding operation is terminated.

FIGS. 8 to 10 respectively show the respective states of the air-core coil forming section 4 when a right hand air-core coil 6R is formed using an air-core coil forming section including the same components as in FIGS. 5 to 7. FIGS. 8 to 10 are the states that are obtained when the states of FIGS. 1 to 3 are rotated 180 degrees about the rotary axis of the shaft 41. Such transition of the states can be achieved simply by rotating the whole air-core coil forming section by 180 degrees without requiring the parts replacement operation or the complicated parts adjusting operation.

The operations of the respective parts of the air-core coil forming section in FIGS. 8 to 10 are similar to those in FIGS. 5 to 7 except that the shaft holder 42 is rotated clockwise and thus the description thereof is omitted here. In FIG. 10, there is shown a right hand coil 6R which is formed in this manner.

If, as in the cylinder 46, there are employed two cylinders which are respectively disposed at two positions symmetric with respect to the shaft 41, (in such a manner that FIG. 5 and FIG. 8 are combined together) so that they can be respectively used to form the left and right hand air-core coils, then the air-core coil forming section can be switched more easily.

As has been described heretofore, according to the present invention, since there is employed a structure that the cutting head can be driven directly by a driving motor, it is possible to provide a sheath peeling section which not only can reduce the number of parts and the cost of the sheath peeling section but also can save the space necessary for installation of the sheath peeling section in the air-core coil forming system. Also, according to the present invention, it is possible to provide a sheath peeling section which can prevent the sheath dust peeled from the sheathed wire from scattering to the periphery thereof.

Furthermore, according to the present invention, there can be provided an air-core coil forming system which can manufacture left and right hand air-core coils simply by rotating a chuck unit holding the leading end of a wire by 180 degrees with no need to replace parts or adjust them in a troublesome manner.

What is claimed is:

1. A air-core coil forming system comprising:

a sheath peeling section including:

a rotatable cylindrical cutting head having a through hole provided at a radial center portion thereof into which a sheathed wire is inserted, a blade portion for peeling a sheath of the sheathed wire, and a blade support member for supporting in a manner that the blade is brought into contact with the sheath by means of a centrifugal force produced when the cutting head is rotated;

a motor directly connected with the cutting head for rotating the cutting head; and a rotary shaft provided in the motor such that a central axis thereof coincides with the through hole of the cutting head and having a hollowed structure into which the sheathed wire is inserted; and a coil forming section including:

a shaft;

a base member capable of revolving around the shaft and shifting in a radial direction of the shaft;

a fixation member integrally provided on the base member and capable of clipping a peeled wire supplied from the sheath peeling section together with the shaft therebetween;

a first urging member for urging the base member such that the fixation member moves toward the shaft;

a second urging member for urging the base member opposite to the urging direction of the first urging member; and a rotation mechanism for rotating the shaft to wind the peeled wire therearound.

2. The air-core coil forming system as set forth in claim 1, wherein the sheath peeling section includes an urging member for urging the cutting head and the motor in the axial direction thereof to shift the same in a length of the peeled sheath at the time of peeling operation.

3. The air-core coil forming system as set forth in claim 1, wherein the sheath peeling section includes a cover member for covering the cutting head, an air introduction member for introducing pressurized air inside of the cover member to blow off sheath dusts produced by the peeling operation from the cutting head, and a dust receiving member provided on the cover member detachably for receiving the sheath dusts blown off by the pressurized air.

4. The air-core coil forming system as set forth in claim 1, wherein the shaft in the coil forming section has a small diameter portion in which the peeled wire is wound therearound and a large diameter portion, and wherein a gap between the fixation member and the large diameter portion generated by shifting of the base portion due to the urging by the second urging member is smaller than the diameter of the peeled wire.

5. The air-core coil forming system as set forth in claim 1, wherein the second urging member in the coil forming section includes a pair of urging members which are disposed so as to be symmetric with respect to the shaft.

6. The air-core coil forming system as set forth in claim 1, wherein one end portion of the shaft of the coil forming section in which the small diameter portion is angled downward.

7. A sheath peeling device comprising:

a rotatable cylindrical cutting head having a through hole provided at radial center portion thereof into which a sheathed wire is inserted, a blade portion for peeling a sheath of the sheathed wire, and a blade support member for supporting in a manner that the blade is brought into contact with the sheath by means of a centrifugal force produced when the cutting head is rotated;

a motor directly connected with the cutting head for rotating the cutting head; and a rotary shaft provided in the motor such that a central axis thereof coincides with the through hole of the cutting head and having a hollowed structure into which the sheathed wire is inserted.

8. The sheath peeling device as set forth in claim 7 further comprising:

an urging member for urging the cutting head and the motor in the axial direction thereof in a length of the peeled sheath at the time of peeling operation.

9. The sheath peeling device as set forth in claim 7 further comprising:

a cover member for covering the cutting head;

an air introduction member for introducing pressurized air inside of the cover member to blow off sheath dusts produced by the peeling operation from the cutting head; and a dust receiving member provided on the cover member detachably for receiving the sheath dusts.

10. The sheath peeling device as set forth in claim 7, wherein the radial center portion of the rotatable cylindrical cutting head includes a hollow shaft body, the through hole is in the hollow shaft body.

11. The sheath peeling device as set forth in claim 7, further comprises:

a first annular body supporting an end portion of the blade; and a second annular body displaced from the first annular body and supporting a middle portion of the blade.

12. The sheath peeling device as set forth in claim 7, wherein the blade is three separate blades disposed on the rotatable cylindrical cutting head and equally spaced apart from one another.

13. The sheath peeling device as set forth in claim 12, further comprising an arc shaped groove on each of the three separate blades.

14. An air-core coil forming device comprising:

a shaft;

a base member capable of revolving around the shaft and shifting in a radial direction of the shaft;

a fixation member integrally provided on the base member and capable of clipping a wire;

a first urging member for urging the base member in a direction that the fixation member closes to the shaft;

a second urging member for urging the base member opposite to the urging direction of the first urging member; and a rotation mechanism for rotating the shaft to wind the wire therearound.

15. The air-core coil forming device as set forth in claim 14 wherein, the shaft in the coil forming section has a small diameter portion in which the peeled wire is wound therearound and a large diameter portion, and wherein a gap between the fixation member and the large diameter portion generated by shifting of the base portion due to the urging by the second urging member is smaller than the diameter of the peeled wire.

16. The air-core coil forming device as set forth in claim 14, wherein the second urging member includes a pair of urging members which are disposed so as to be symmetric with respect to the shaft.

17. The air-core coil forming device as set forth in claim 14, wherein one end portion of the shaft in which the small diameter portion is angled downward.

* * * * *